United States Patent [19]

Alexeff

[11] 4,412,150

[45] Oct. 25, 1983

[54] MASER

[76] Inventor: Igor Alexeff, 2709 Turnpike, Oak Ridge, Tenn. 37830

[21] Appl. No.: 205,992

[22] Filed: Nov. 12, 1980

[51] Int. Cl.³ .............................................. H01J 25/00
[52] U.S. Cl. .................................. 315/4; 313/231.31; 315/3; 315/5; 315/111; 315/111.01; 328/233; 372/87
[58] Field of Search .......................... 315/3, 4, 5, 111; 328/233; 313/231.31, 231.41; 372/87, 92

[56] References Cited

U.S. PATENT DOCUMENTS

| 2,402,184 | 6/1946 | Samuel ..................................... 315/4 |
| 2,843,732 | 7/1958 | Johnson et al. . |
| 2,849,650 | 8/1958 | Quate et al. . |
| 2,925,523 | 2/1960 | Weibel ..................................... 315/3 |
| 3,184,632 | 5/1965 | Weibel ................................... 315/4 X |
| 3,249,793 | 5/1966 | Welker et al. ........................... 315/5 |
| 3,378,723 | 4/1968 | Napoli et al. ............................ 315/3 |
| 3,484,602 | 12/1969 | McIlraith . |
| 3,521,117 | 7/1970 | Schmidt ............................... 315/5.35 |
| 3,569,825 | 3/1971 | Lillienfeld . |
| 3,621,454 | 11/1971 | Meeks . |
| 4,070,595 | 1/1978 | Miller ................................... 328/233 |
| 4,080,549 | 3/1978 | Creedon et al. ................. 313/231.31 |
| 4,150,340 | 4/1979 | Kapetanakos et al. ................. 315/3 |
| 4,213,073 | 7/1980 | Mahaffey et al. ................... 328/233 |
| 4,291,255 | 9/1981 | Alexeff ............................. 313/231.41 |

*Primary Examiner*—Saxfield Chatmon, Jr.
*Attorney, Agent, or Firm*—Luedeka & Neely

[57] ABSTRACT

A method and apparatus for generating microwave radiation includes a cathode, comprising parallel side wall means, a first end wall and a second end wall parallel to the first end wall, which defines a space. An aperture is defined within each of the end walls. An elongated anode extends across the defined space and outwardly through the apertures. Free electrons are generated adjacent to the anode and a positive potential is applied between the cathode and the anode. Electrons are trapped in a surrounding relation with the anode and microwave radiation is generated.

15 Claims, 3 Drawing Figures

MASER

The present invention relates to a method and apparatus for generating microwave radiation and more particularly to a voltage tuneable system for producing short wavelength microwave radiation by use of readily available voltages.

Microwave radiation has many present uses beyond the well-known ovens, including long distance communications and radar, for example. Moreover, there are many potential uses for microwave radiation, such as in the development of fusion energy. However, the development of uses for microwave radiation has been retarded through inadequate masers for generating such radiation.

The basic principle of operation of any maser is that electrons oscillate in a system in which the electrons both are confined for a long time and in which the electron frequency varies with energy. Electrons interacting with the noise field in a microwave cavity gain or lose energy, experience a frequency shift, drift in phase, and after some latent period, "phase bunch" and release a coherent burst of radiation. In a free-electron maser, using nonrelativistic electrons trapped in a uniform magnetic field, the frequency is independent of energy, and maser action cannot occur. However, maser action can occur in a free-electron maser if the electrons are made relativistic, so that the relativistic change of mass with energy produces a frequency shift with changing electron energy.

Magnetic systems have frequently been used for generating microwave radiation, however, various ranges of wavelength have proven to be quite difficult to generate on a selective, or tuneable, basis. Microwave radiation having a wavelength of less than about one millimeter has been particularly difficult to generate. Current limits in magnetic field strength have restricted conventional magnetic field devices to wavelengths greater than about one millimeter.

In order to overcome the deficiencies of current magnetic field devices, efforts have been made to develop a tuneable microwave generator which does not require a magnetic field. U.S. Pat. No. 4,150,340 discloses such an attempt. The apparatus disclosed therein includes a planar cathode and a closely spaced foil anode. Electrons emitted from the cathode oscillate back and forth through the anode. The electrons phase bunch and emit microwave radiation. However, a serious limitation of such a system is the requirement of a high voltage generator capable of producing a 250–350 kilovolt pulse. In addition to the obvious limited availability and great expense of such high voltage generators, the radiation developed by such an apparatus is not suitable for many uses.

The maximum duration of a suitable pulse from such a high voltage generator is quite limited, i.e. on the order of 50 nanoseconds. Longer pulses are unsuitable for the system because the field breaks down. This duration is simply insufficient for many applications, especially where substantially continuous radiation is desired.

Previous work with electrons orbiting electrostatically used quite different physical arrangements such as an electron gun, an electron collector, and a single-pass electron beam. In accordance with the present invention, free electrons are developed within an ion plasma and then trapped in an orbital path around a linear anode by a balance between an electric field and centrifugal force. The electrons are prevented from travelling parallel to the anode by a fringing field at each end of the anode. This trapping causes the electrons to orbit, travelling a mean free path of many meters, and results in a sufficiently long "latent period" to permit phase bunching to occur and the generation of microwave radiation.

It is an object of the present invention to provide a method and apparatus for generating microwave radiation by use of readily available voltages and materials. It is also an object to provide a method and apparatus for generating microwave radiation for substantially longer durations than heretofore available without magnetic fields. It is an additional object to provide a method and apparatus for generating microwave radiation having a wavelength of less than about one millimeter. Further objects and advantages will be apparent when the following description is considered along with the accompanying drawings in which:

Generally, in accordance with the present invention, a sealed container defines a chamber within which an anode and a cathode are located. The container is evacuated to a level of about $10^{-4}$ Torr. The cathode comprises parallel wall means defining a space, a first aperture and opposed second aperture. The anode comprises an elongated wire which extends across the defined space and outwardly through the opposed apertures defined in said cathode. A positive potential is applied between the anode and cathode to develop an ion plasma around the elongated anode. Electrons within the plasma orbit around the anode, ultimately phase bunching and emitting microwave radiation. The frequency of the microwaves is controllable through the voltage applied to the anode and cathode and through selection of the diameter of the anode, which controls the frequency of the orbital motion of the electrons. The microwaves are directionally controllable by means of apertures defined in the cathode and antennae.

Figure 1:
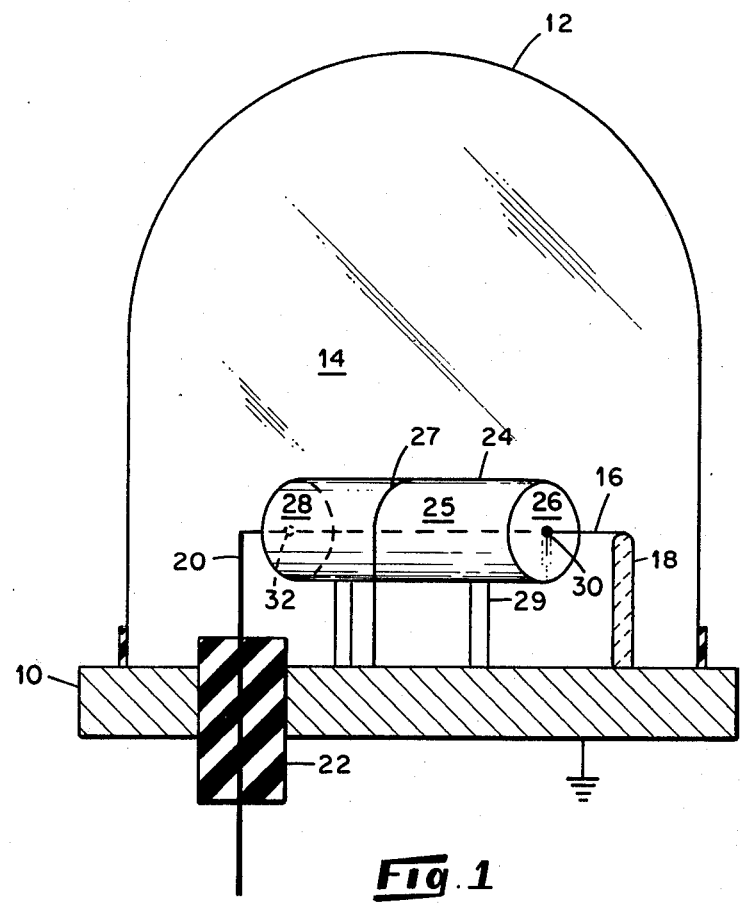
FIG. 1 is a schematic diagram of an apparatus embodying various of the features of the present invention.

Referring more specifically to FIG. 1, there is depicted a system embodying various of the features of the present invention. An aluminum base plate 10 and a glass bell jar 12 cooperatively comprise a container which defines a sealed chamber 14 suitable for maintaining an evacuated atmosphere of air at about $10^{-4}$ Torr. Alternatively, the chamber 14 may be backfilled with nitrogen or argon, for example. A conventional vacuum pump (not shown) is connected to the sealed container for evacuating the container.

The anode 16 is stretched tight within the chamber 14 between a high voltage insulator 18 and a conducting post 20. This arrangement ensures that the anode 16 is maintained in a linear configuration. The insulator 18 is mounted upon the base plate 10, which is grounded, and the post 20 extends through a second high voltage insulator 22 sealingly mounted in the base plate 10. The conducting post 20 is electrically connected to the positive side of a standard high voltage power supply (not shown), which is capable of producing about 30 kilovolts.

The anode 16 comprises a smooth copper wire having a diameter of about 5 mils, but may range between about one and about 15 mils. The anode may also comprise other conducting metals such as tungsten, for example. As will be discussed more fully hereinafter, the diameter of the anode 16 is selected in accordance with the desired frequency of the radiation to be generated.

The anode 16 extends through a substantially enclosed hollow cathode 24. In the depicted embodiment, the cathode 24 comprises a cylindrical tube so that each section of the side wall 25 is parallel to the opposing section of the side wall 25. Alternatively, the side walls of the cathode may comprise a pair of parallel plates. The cathode 24 is enclosed with a planar first end wall 26 and a planar second end wall 28 to define an enclosed space. The end walls 26 and 28 are parallel to one another and perpendicular to the axis of the cathode 24. Apertures 30 and 32 are defined in the end walls 26 and 28, respectively. The apertures 30 and 32 are opposed to one another and axially aligned with the axis of the cathode 24. The apertures are about $\frac{1}{8}$ inch in diameter to permit the anode 16 to pass axially therethrough without contacting the cathode and with sufficient space to prevent arcing in the evacuated atmosphere of the chamber 14.

The cathode 24 comprises a non-magnetized metal such as aluminum or copper. In one embodiment, an aluminum beer can, having a length of about 6 inches and a diameter of about 3 inches, was successfully used as a cathode 24 by drilling holes approximately $\frac{1}{8}$ inch in diameter in the top and bottom of the can to empty the contents and insert the anode wire.

The cathode 24 is fixedly mounted within the chamber 14 by means of a rubber band 27 holding it to a lucite slab 29.

Figure 2:
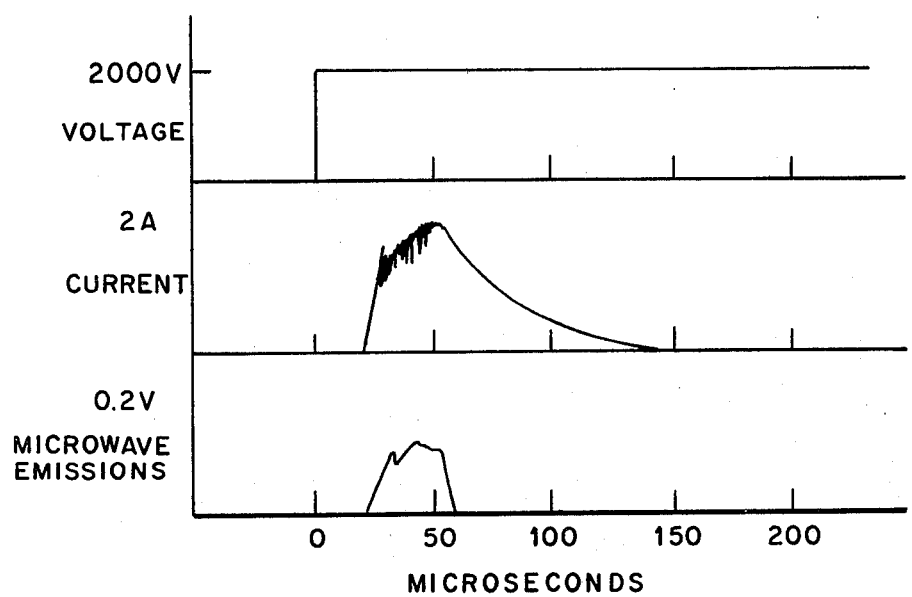
FIG. 2 is a graph illustrating the generation of microwave radiation in accordance with the present invention.

In operation, a positive potential of at least about 500 V is developed between the anode and cathode by applying a square wave pulse of two kilovolts, for example, to the anode 16. As illustrated in FIG. 2, a short period of time, i.e. about 20 microseconds, elapses after the voltage is applied before a current flow of about 2 amps develops and intense microwave emission develops. The elapsed time decreases with an increased gas pressure and quantitatively is consistent with the build up of an ionizing electron cloud by a rotating electron avalanche. Whereas in the depicted embodiment electrons are generated within an ion plasma, alternative techniques, such as a heated filament may be used to generate electrons for orbiting the anode. The current and microwaves continue for a period of about 20 microseconds. The emitted radiation escapes from the chamber via the anode. The radiation intensity and polarization patterns indicate that the anode wire acts as a simple antenna.

The peak frequency of the emitted radiation is dependent upon both the wire size and the applied voltage. As a result, the generator is tunable by varying either the wire size, the applied voltage or both. For example, employing a wire having a diameter of about 5 mils, microwave radiation having a wavelength range of about 3 cm. was generated. Under similar conditions, an apparatus including a wire having a diameter of about 3 mils generated radiation having a wavelength of about 8 mm.

Figure 3:
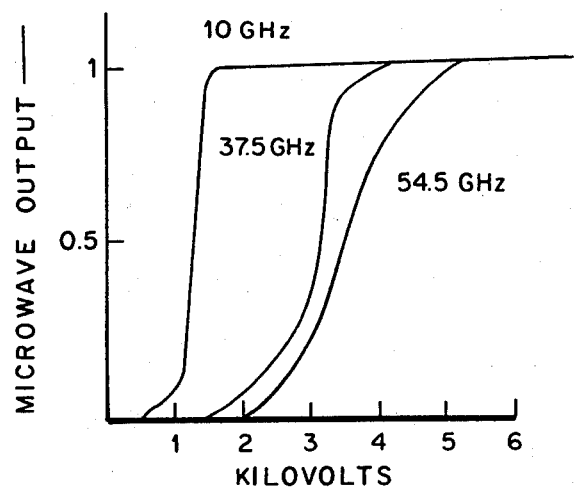
FIG. 3 is a graph illustrating the frequency dependence upon voltage of microwave radiation generated in accordance with the present invention.

As illustrated in FIG. 3, the output of a given frequency of microwave radiation is dependent upon the voltage applied to the system.

It has also been determined that the amount of radiation emitted by a generator in accordance with the present invention increases in proportion to the square of the number of anode wires extending through the cathode. Theory predicts that the orbiting electrons around each wire phase-lock within the chamber, giving the observed results.

In contrast to magnetic field devices, the microwave radiation output of the present invention is increased as the magnetic field is reduced. That is, not only is it better not to apply a magnetic field, but in fact is preferred to reduce the effects of the earth's magnetic field. As a result, the entire chamber is preferably surrounded with a magnetic field shield, such as a cylinder of Mu metal. Employing such shielding, microwave emission occurs as a chain of pulses, a quasi steady state operation with a direct current 50 mA feed.

Employing an apparatus in accordance with the present invention, pulses of microwave radiation having a duration of about 40 microseconds have been produced at a rate of 10,000 pulses per second for fifteen minutes. The microwaves have a wavelength of about 3 cm. Moreover, the apparatus is tunable by varying the potential applied or the diameter of the anode. It is believed that a single wavelength pulse can be produced by the use of a multi-layer narrow band dielectric mirror as a portion of the cathode parallel walls. A single wavelength can also be developed by stimulating emission with an input signal. In this manner the disclosed microwave generation system can be employed as an amplifier for microwave radiation. Also, intense, short pulses can be developed by adding a Q-spoiling feature to the system. Such Q-spoiling can be achieved with a rotating plate or an absorbing filter which is activated sequentially, for example. In addition the radiation is aimable by selective location of apertures in the cathode and antennae extending therethrough.

While a preferred embodiment of the present invention has been shown and described herein, it is understood that various changes and modifications may be made without deviating from the spirit or scope of the invention and there is no intention to limit the scope of the invention except as set forth in the following claims.

What is claimed:

1. A system for generating microwave radiation comprising:
   a cathode comprising parallel side wall means;
   a first end wall;
   a second end wall spaced apart from and opposed to said first end wall;
   a first aperture defined in said first end wall and an opposed second aperture defined in said second end wall;
   said side wall means, first and second end walls cooperatively defining a space;
   an elongated anode extending across said space and outwardly through each of said first and second apertures;
   means for generating free electrons adjacent to said anode;
   means for applying a potential between said cathode and said anode with said anode having a positive voltage relative to said cathode for electrostatically trapping said free electrons in a surrounding relation with said anode to electrostatically produce a phase bunching in orbit of the electrons and to emit microwave radiation from the chamber defined by said cathode; and said cathode forming a cavity for containing microwaves to interact with the electrons surrounding said anode.

2. A system as defined in claim 1 wherein said anode comprises a wire having a diameter between about 0.01 inch and about 0.001 inch.

3. A system as defined in claim 1 wherein said anode comprises a plurality of parallel, spaced apart wires.

4. A system as defined in claim 1 and further comprising means for shielding said system from a magnetic field.

5. A system as defined in claim 1 wherein said means for applying a positive potential to said cathode and anode provides a potential of at least about 500 V.

6. A system as defined in claim 1 and further comprising container means for maintaining said cathode and said anode in an atmosphere having a pressure of about $10^{-4}$ Torr.

7. A system as defined in claim 1, wherein said parallel side walls means comprises a tube.

8. A system as defined in claim 1 wherein said parallel side wall means comprises a cylinder.

9. A method of producing microwave radiation comprising:
enclosing an anode and a cathode within a sealed container, said cathode comprising parallel side wall means, a first end wall and a second end wall spaced apart from and opposed to said first end wall, said first end wall defining a first aperture and said second end wall defining an opposing second aperture, said anode comprising an elongated wire means extending across a space, defined by said side wall means and said first end wall and said second end wall, and outwardly through said first aperture and said second aperture;
applying a potential of at least about 500 V between said cathode and said anode;
developing an ion plasma within said space of said cathode and surrounding said anode;
electrostatically trapping electrons contained in said plasma in orbit around said anode;
phase bunching in orbit of the electrons to produce microwave radiation; and
containing microwave radiation within said side wall means and said first and second end walls for interacting with electrons orbiting the anode.

10. A method as defined in claim 9 and further comprising the step of shielding said container from a magnetic field.

11. A method as defined in claim 9 and further comprising evacuating said sealed container to a pressure of about $10^{-4}$ Torr.

12. A method of producing microwave radiation in a microwave apparatus having an anode, a cavity and a cathode comprising:
applying a positive voltage to the anode relative to the voltage potential on the cathode;
producing an electric field in at least a partially surrounding relationship with said anode;
producing free electrons rotating about said anode;
electrostatically trapping the free electrons that are rotating about said anode within the electric field to electrostatically produce phase bunching in orbit of the electrons and emission of microwave radiation; and
containing microwave radiation in the cavity for interaction with the electrons surrounding said anode.

13. The method of claim 12 further comprising emitting the microwave radiation through the anode which acts as an antenna.

14. The system of claim 1 wherein said means for generating free electrons comprises said means for applying a potential.

15. The system of claim 1 wherein said means for applying a potential and for trapping said free electrons is operable to trap said free electrons in an orbiting relationship with said anode.

* * * * *